(No Model.) 3 Sheets—Sheet 1.

E. THOMSON.
METHOD OF ELECTRIC SOLDERING, CEMENTING, &c.

No. 423,966. Patented Mar. 25, 1890.

ATTEST:
J. H. Hurdle
Wm. H. Capel

INVENTOR:
Elihu Thomson
By H. L. Townsend
Attorney (No Model.) 3 Sheets—Sheet 2.
E. THOMSON.
METHOD OF ELECTRIC SOLDERING, CEMENTING, &c.
No. 423,966. Patented Mar. 25, 1890.
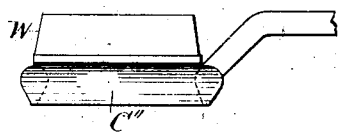
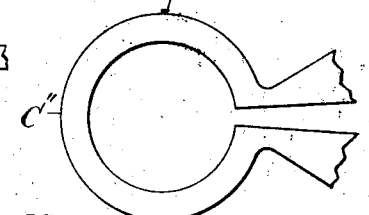
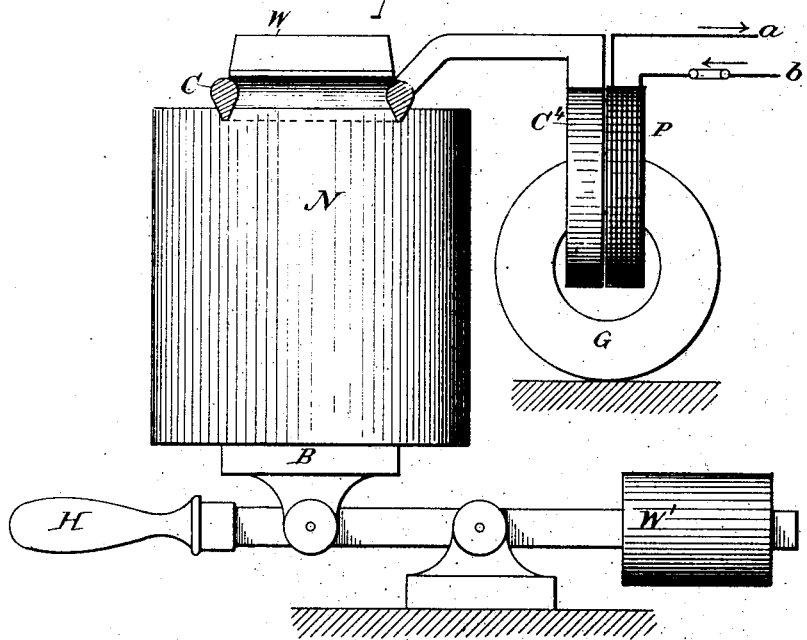
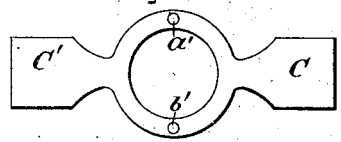
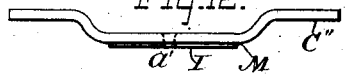
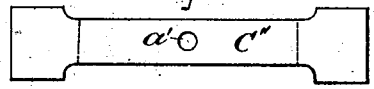
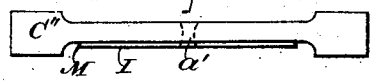
ATTEST:
J. H. Hurdle
Thos. N. Capes
INVENTOR:
Elihu Thomson
By H. C. Townsend,
Attorney (No Model.) 3 Sheets—Sheet 3.
E. THOMSON.
METHOD OF ELECTRIC SOLDERING, CEMENTING, &c.
No. 423,966. Patented Mar. 25, 1890.

ATTEST:

INVENTOR:
Elihu Thomson
By H. E. Townsend
Attorney

UNITED STATES PATENT OFFICE.

ELIHU THOMSON, OF LYNN, MASSACHUSETTS.

METHOD OF ELECTRIC SOLDERING, CEMENTING, &c.

SPECIFICATION forming part of Letters Patent No. 423,966, dated March 25, 1890.

Application filed August 16, 1889. Serial No. 321,044. (No model.)

*To all whom it may concern:*

Be it known that I, ELIHU THOMSON, a citizen of the United States, and a resident of Lynn, in the county of Essex and State of Massachusetts, have invented a certain new and useful Method of Electric Soldering, Cementing, &c., of which the following is a specification.

My invention relates to those processes of uniting metal or other objects which require the employment of heat to soften or fuse the uniting material, that by afterward cooling and becoming set fixes or joins the objects firmly together.

My invention consists, essentially, in heating an electric conductor by a current of large volume and conveying the heat generated therein to the work, which is for that purpose placed in juxtaposition to or contiguous to the conductor.

My invention is distinguished from prior methods of soldering or uniting metal objects by the employment of heating-currents of electricity, in that, instead of interposing the objects one or both in the circuit of the heating-current of electricity, I cause the current to pass through a heating electric conductor independent of the objects and preferably out of all electric connection with them, but in sufficiently close proximity to the work to cause the object or objects to be heated to the requisite degree for soldering or similar operations.

My invention consists, also, in certain improved processes or methods involving the application of a heating-current of electricity to special purposes—such as soldering, tinning, and cementing operations—and also in certain apparatus and devices useful in practicing the method or process described and claimed herein.

Figure 2:
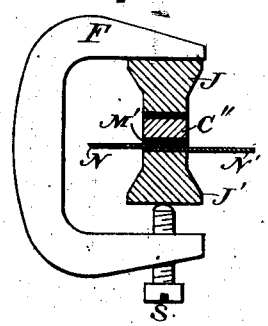
Figure 1:
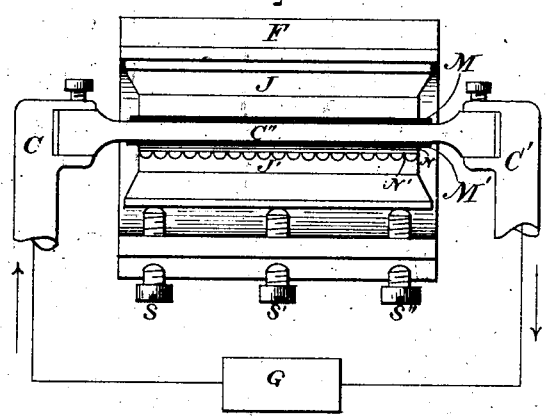
Figure 3:
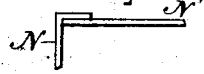
Figure 4:
Figure 5:
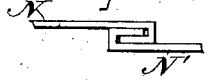
Figure 6:
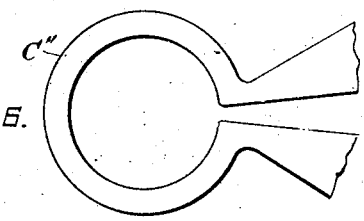
Figure 7:
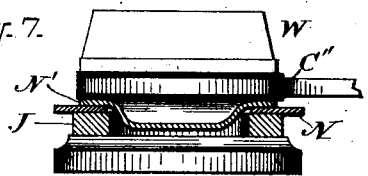
Figure 15:
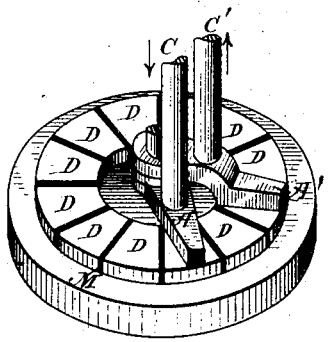
Figure 16:
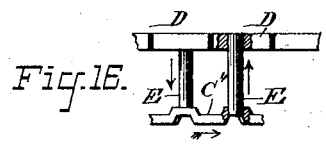
Figure 17:
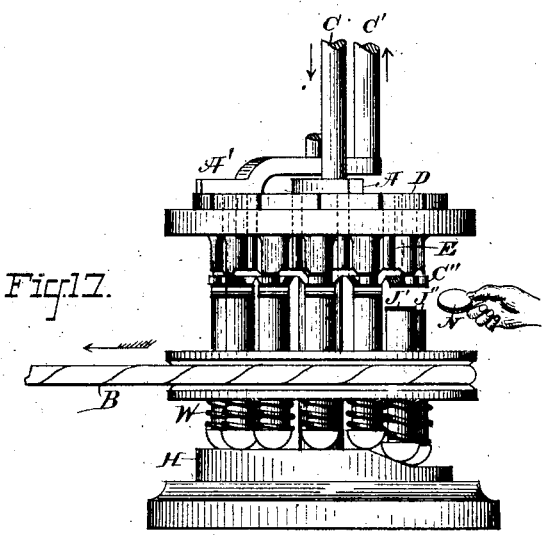

In the accompanying drawings, Figure 1 is a front elevation of an apparatus suitable for practicing my invention. Fig. 2 is a side elevation and vertical section through the same. Figs. 3, 4, and 5 illustrate varieties of work which my invention is applicable to. Fig. 6 shows a particular form of heating-conductor useful in connection with forming circular joints. Fig. 7 is a side elevation of work and apparatus, illustrating the use of the device Fig. 6. Figs. 8, 9, and 10 illustrate apparatus suitable for use in accordance with my invention, Fig. 10 showing the apparatus as applied to the soldering of the cover of a tin can. Fig. 11 shows in plan, and Fig. 12 in edge view, another form of conductor suitable for forming circular joints and provided with means for electrically insulating it from the work. Figs. 13 and 14 show in plan and edge view another form of conductor provided with an insulated surface and protective face. Fig. 15 shows in perspective a top view of the switch employed in connection with the apparatus shown in Fig. 17 in side elevation. Fig. 16 shows in side elevation and partial section a detail of the construction. Fig. 17 is a side elevation of an apparatus adapted for rapid work in soldering objects in accordance with my invention.

Referring to Fig. 1, G indicates a generator, of any suitable character, adapted to produce or generate electric currents, alternating or continuous, of considerable volume, but of comparatively small electro-motive force, while C C' are heavy electric conductors connecting such source with a conducting plate or rod C'', through which the heavy current is passed for the purpose of heating such conductor C''. The form given to the conductor C'' varies with the form of the work which is subjected to heating by it. J J' are jaws or clamps adapted to hold the work between them and the conductor C''. Upon the faces of the heating-conductor C'' a thin layer of some insulating material is preferably applied—such, for instance, as mica. I prefer mica because it is not easily destroyed by heat. The thickness of the layer, as illustrated in the drawings, is somewhat exaggerated. F is a suitable frame for supporting the parts.

In the operation of soldering or tinning together two pieces of metal N N' they are first placed in position between one of the jaws, as J', and the heating-conductor C'', so as to be in juxtaposition to the latter and exposed to the heat from the same when such conductor is heated by the electric current. The current is allowed to traverse the heating-conductor C'' until the pieces N N' have by conduction received from C'' sufficient heat to melt the tin, solder, or other cementing material placed between them at the joint, after which the current is cut off and the work allowed to cool under pressure. Suitable clamping-screws S S' S'' are applied to the jaw or holder J' for the purpose of pressing the work and the heating-conductor into close and firm contiguity. Any other holding or clamping devices might be employed for the purpose. It will be seen that in this operation no part of the current flowing through the conductor C'' passes through the work N N'.

Figs. 3, 4, and 5 illustrate other kinds of joints, which may be soldered by the employment of suitably-formed heating-conductors. In Fig. 4 the pieces to be united by soldering or tinning their surfaces together are at right angles to each other, one part being bent to overlap upon the other. The two pieces might be interlocked, as indicated in Figs. 4 and 5, their heating-surfaces being coated with proper cementing or soldering material or having such material interposed between them. The conductor C'' might be made circular, as shown in Fig. 6, and would then be adapted to use in applying my process to the soldering together of the bodies and lids of tin cans.

Fig. 7 illustrates the application of the conductor C'' to the formation of a circular joint. N N' are the two parts to be united, and J the holder or support therefor. The heating-conductor C'' is held in close juxtaposition to the work by means of a suitable weight W.

Fig. 10 shows the apparatus organized for soldering a cover to a tin can. The conductor C'' of the form shown in Fig. 9 is provided with a weight W for holding it down to the work. The conductor C'' is supplied with current from the secondary C⁴ of the converter or induction coil, the primary of which (indicated at P) derives alternating or other currents from wires or conductors a b. G is the usual mass of iron encircled by the coils of the converter. A tin can N, carried by support B, is pressed up toward the soldering or heating conductors C'' by means of a weight W'. A handle H serves to depress the support when the can is to be removed. In order to protect the mica insulation on the surface of the conductor from injury, I face it with a thin sheet or piece of metal, such as sheet-iron, (indicated at I, Figs. 12 and 14.) This facing of iron or metal is applied so that it will not form a path for any of the current flowing in the conductor C''. Thus in Fig. 11 the sheet-iron is riveted to the conductor C'', formed as a circle at the points a' b', which are points of equal potential when the current flows from conductor C to conductor C', through the ring C''. When the heating-conductor is straight, as in Figs. 13 and 14, the metal facing may be fastened, as indicated at a', to the middle point of the conductor.

In Figs. 15, 16, and 17 I have shown an apparatus that is suitable for use in uniting a large number of objects of the same form or character, such as lids of tin cans to other bodies. This apparatus is so constructed that one or more pieces are undergoing heating while the others are cooling, and the necessary pressure to complete the union is brought to automatically bear upon the work at the proper moment. C C' are the conductors of large gage, which connect from the source of heating-current and supply-current to terminal blocks A A', insulated from one another and forming the contacts of a rotary or other switch, the contact-blocks of which (indicated at D D, &c.) are carried by a disk that is rotated by means of a belt B. This belt operates on a wheel fixed to the same shaft with the support for the blocks D D. The contact-plates D D are connected by rods E E, of conducting material, with the heating-conductor C'', which is formed, as shown in Figs. 16 and 17, so as to have a number of projecting or heating faces between the rods E E. J J' indicate a number of clamping-jaws or holders, corresponding in position to the heating-faces of the conductor C'' and mounted as spring-actuated followers in the disk, to which belt B is applied. To these followers are applied springs W, that tend to press them down upon a cam-surface H, over which they ride, and which is provided with a depression at a portion of its periphery, so as to permit the jaws J' to be lowered to receive the parts N to be soldered together. As the followers move around, they ride upon the cam and bring the parts into firm contact with the portion of heating-conductor immediately over the jaw. As the jaws or holders rotate with the conductors C'', the part of the latter immediately above the object is brought into position where it will be included in circuit between the arms A A' and will be heated, thus fusing the soldering or cementing material. As soon as this takes place, the continuance of movement carries the part of the heating-conductor in question out of circuit and the cam-surface H maintains the pressure until the soldering or cementing material is cooled, when the revolution having been completed the pieces are released at the depressed portion of the cam. The path of the current is through the arm A down to the heating-conductor C'' at the part thereof under the arm A, thence to the other conductor A', and out by conductor C'.

The apparatus herein shown is not specifically claimed, as it forms the subject of another application filed by me as a division of the present application October 16, 1889, Serial No. 327,238.

What I claim as my invention is—

1. The herein-described improvement in uniting metals or other objects by the application of heat, consisting in passing a heating electric current through a conductor in juxtaposition to the work, as and for the purpose described.

2. The herein-described improvement in cementing or soldering operations in which heat is employed to heat the cementing or soldering material, consisting in passing a heating electric current through a conductor contiguous to the work, but electrically insulated therefrom, as and for the purpose described.

3. The herein-described method of forming circular joints by the aid of solder or cement, consisting in applying a circular conductor to the work with the cementing or soldering material between the objects and passing an electric current of large volume through such circular conductor in sufficient amount to heat the same to the requisite temperature, as and for the purpose described.

4. The herein-described improvement in uniting objects of metal or other material by the application of heat, consisting in passing a heating electric current through a contiguous heating-conductor, cutting off such current, and maintaining the pressure upon the pieces while they are cooling.

5. The herein-described improvement in uniting objects of metal or other material by the application of heat, consisting in heating them by an electric current passed through a conductor in juxtaposition to the objects while they are pressed together and permitting the pieces to cool under pressure.

Signed at Lynn, in the county of Essex and State of Massachusetts, this 6th day of August, A. D. 1889.

ELIHU THOMSON.

Witnesses:
JOHN W. GIBBONEY,
A. L. ROHRER.